United States Patent
Zarkesh-Ha et al.

(10) Patent No.: US 7,082,580 B2
(45) Date of Patent: Jul. 25, 2006

(54) ENERGY RECYCLING IN CLOCK DISTRIBUTION NETWORKS USING ON-CHIP INDUCTORS

(75) Inventors: Payman Zarkesh-Ha, Fremont, CA (US); William Loh, Fremont, CA (US)

(73) Assignee: LSI Logic Corporation, Milpitas, CA (US)

( * ) Notice: Subject to any disclaimer, the term of this patent is extended or adjusted under 35 U.S.C. 154(b) by 470 days.

(21) Appl. No.: 10/364,866

(22) Filed: Feb. 10, 2003

(65) Prior Publication Data

US 2004/0158758 A1 Aug. 12, 2004

(51) Int. Cl.
*G06F 17/50* (2006.01)

(52) U.S. Cl. .......................................................... 716/1
(58) Field of Classification Search ..................... 716/1; 713/500; 326/62
See application file for complete search history.

(56) References Cited

U.S. PATENT DOCUMENTS

| | | | |
|---|---|---|---|
| 4,866,299 A * | 9/1989 | Kannegundla | 327/111 |
| 6,437,653 B1 * | 8/2002 | Cruz et al. | 331/181 |
| 6,448,847 B1 * | 9/2002 | Paul et al. | 327/563 |
| 6,473,291 B1 * | 10/2002 | Stevenson | 361/306.3 |
| 6,546,528 B1 * | 4/2003 | Sasaki et al. | 716/5 |
| 6,690,243 B1 * | 2/2004 | Henrion | 331/117 R |

OTHER PUBLICATIONS

Huo et al.; "Silicon-Based High-Q Inductors Incorporating Electroplated Copper and Low-K BCB Dielectric"; *IEEE Electron Device Letters*; IEEE; vol. 23, No. 9; Sep. 2002; pp. 520-522.

Lihui et al.; "High Q Multilayer Spiral Inductor on Silicon Chip for 5~6 GHz"; *IEEE Electron Device Letters*; IEEE; vol. 23, No. 8; Aug. 2002; pp. 470-472.

Chi; "Salphasic Distribution of Clock Signals for Synchronous Systems"; *IEEE Transactions on Computers*; IEEE; vol. 43, No. 5; May 1994; pp. 597-602.

* cited by examiner

*Primary Examiner*—Vuthe Siek
(74) *Attorney, Agent, or Firm*—Eric J. Whitesell

(57) ABSTRACT

A clock distribution network for an integrated circuit includes a clock driver for generating a clock signal having a selected clock frequency, a clock net coupled to the clock driver wherein the clock net has a capacitive reactance, and an inductor coupled to the clock net wherein the inductor has an inductive reactance that is substantially equal to the capacitive reactance of the clock net at the selected clock frequency to minimize clock driver output current.

16 Claims, 5 Drawing Sheets

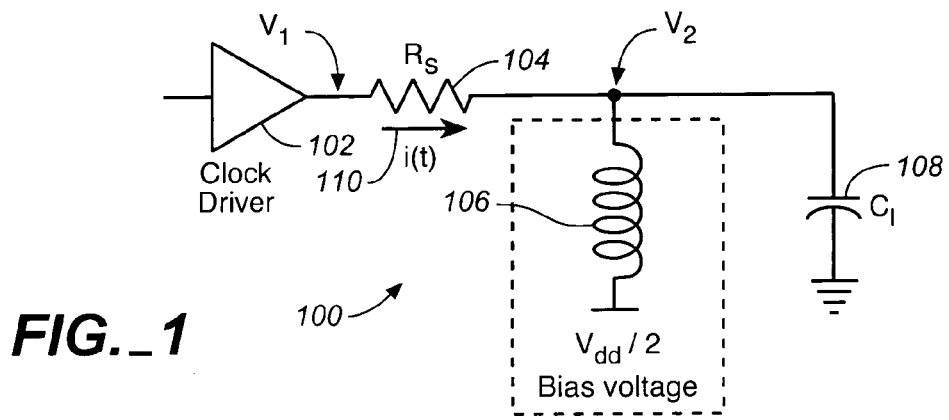
FIG._1
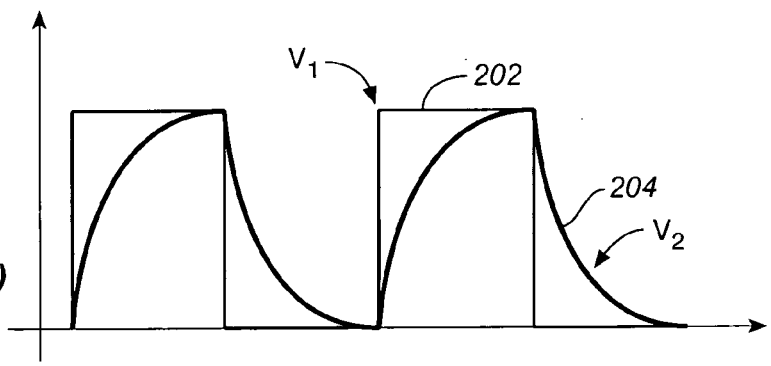
FIG._2
(PRIOR ART)
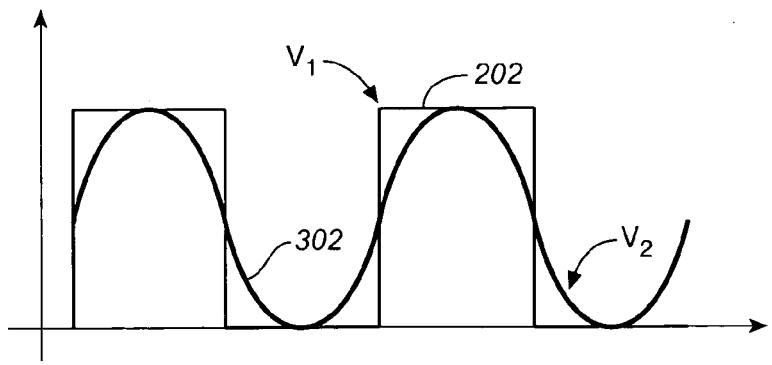
FIG._3

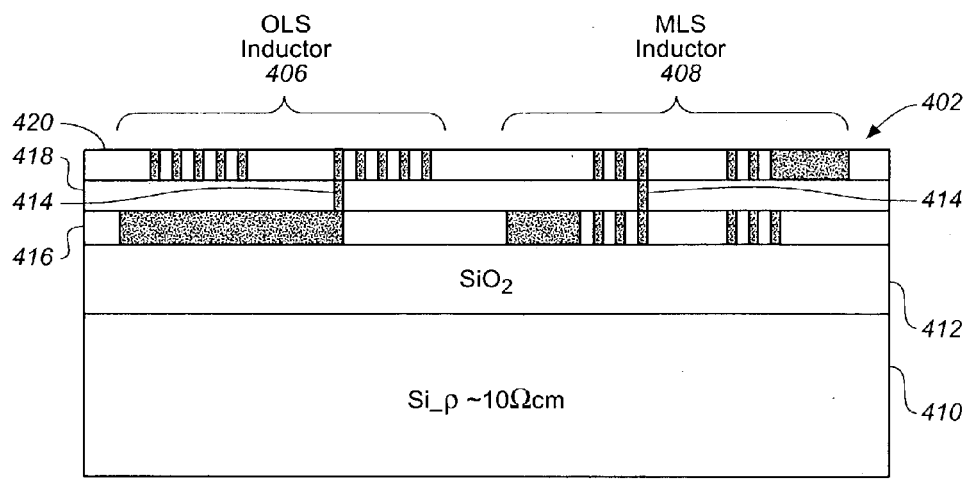
FIG._4A
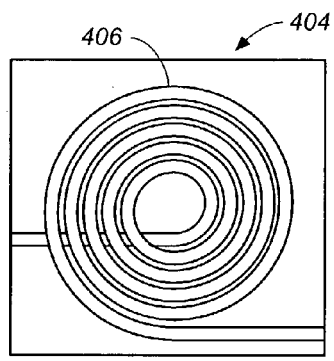    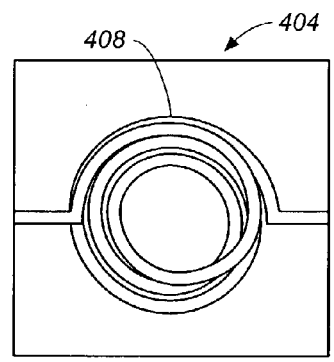
FIG._4B            FIG._4C

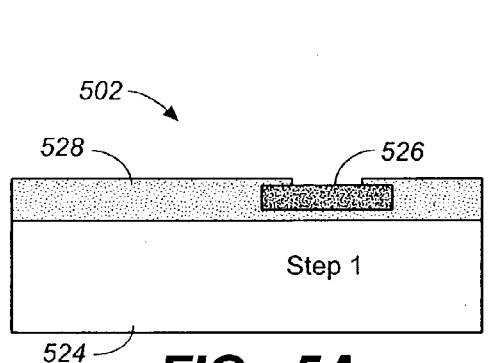
FIG._5A
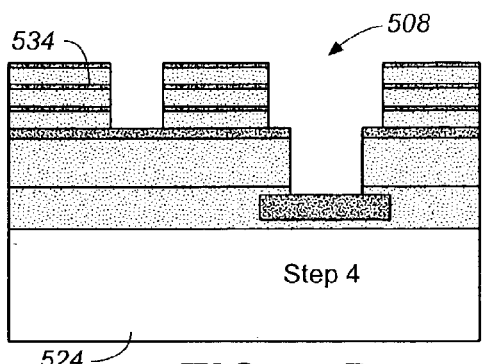
FIG._5D
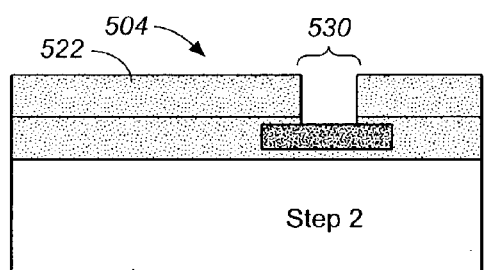
FIG._5B
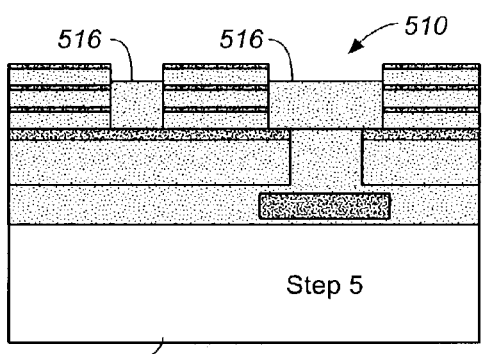
FIG._5E
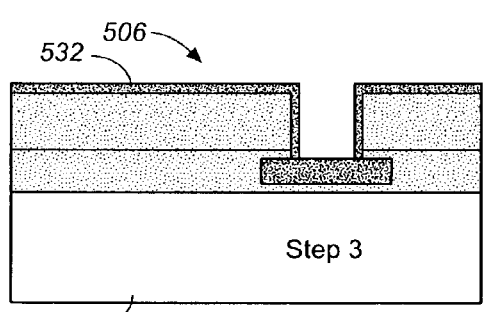
FIG._5C
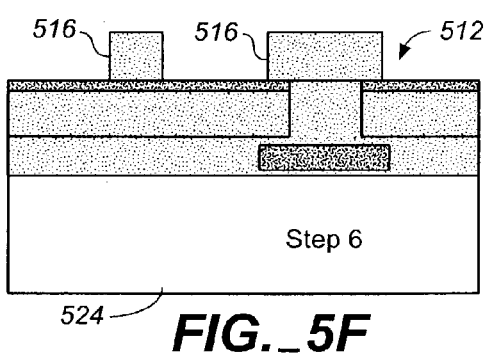
FIG._5F
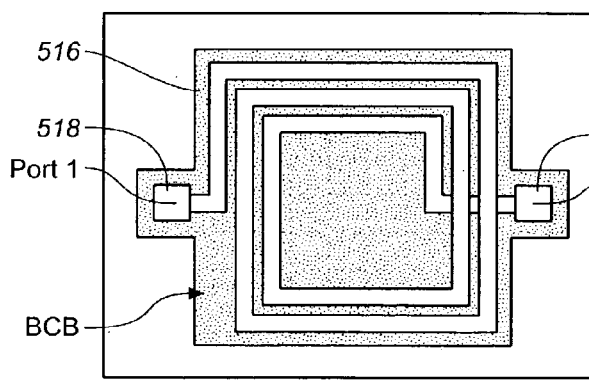
FIG._5G

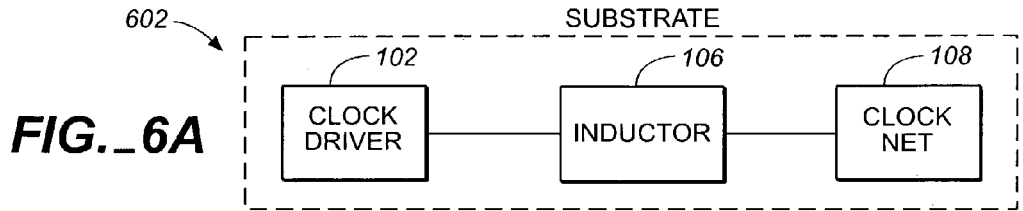
FIG._6A
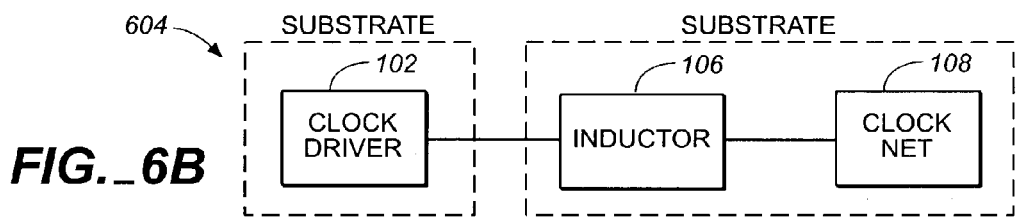
FIG._6B
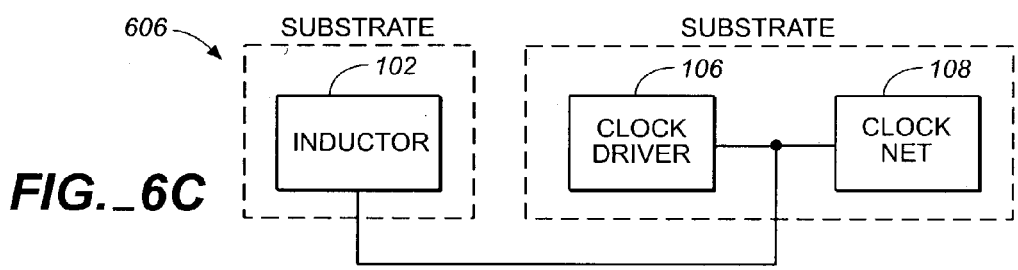
FIG._6C
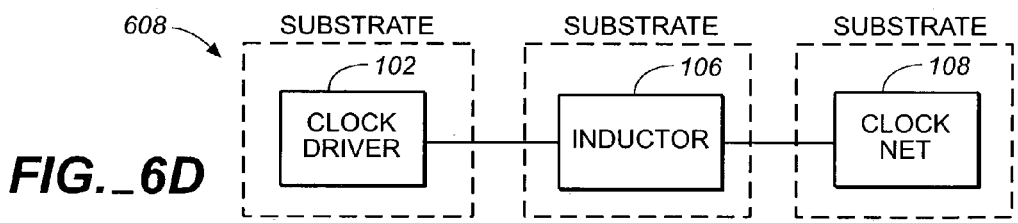
FIG._6D
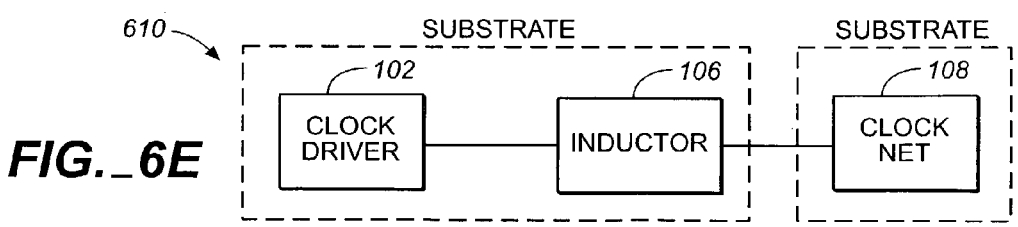
FIG._6E

ENERGY RECYCLING IN CLOCK DISTRIBUTION NETWORKS USING ON-CHIP INDUCTORS

BACKGROUND OF THE INVENTION

1. Field of the Invention

The present invention is directed to methods and devices for clock distribution networks in integrated circuits. More specifically, but without limitation thereto, the present invention is directed to a resonant clock distribution network for an integrated circuit.

2. Description of the Prior Art

High power consumption in clock distribution networks is a problem in large integrated circuit designs in which the clock power dissipation is dominated by dynamic or switching power, which is proportional to the wiring capacitance and the input capacitance of flip-flops connected to the clock net. As a result, high power dissipation and heating may be generated by clock distribution networks.

SUMMARY OF THE INVENTION

In one aspect of the present invention, a clock distribution network for an integrated circuit includes a clock driver for generating a clock signal having a selected clock frequency, a clock net coupled to the clock driver wherein the clock net has a capacitive reactance, and an inductor coupled to the clock net wherein the inductor has an inductive reactance that is substantially equal and opposite to the capacitive reactance of the clock net at the selected clock frequency to minimize clock driver output current through the clock net.

In another aspect of the present invention, a method of distributing a clock signal in an integrated circuit includes the steps of generating a clock signal having a selected clock frequency from a clock driver, coupling the clock signal to a clock net having a capacitive reactance, and coupling an inductor to the clock net wherein the inductor has an inductive reactance that is substantially equal and opposite to the capacitive reactance of the clock net at the selected clock frequency to minimize clock driver output current through the clock net.

BRIEF DESCRIPTION OF THE DRAWINGS

The present invention is illustrated by way of example and not limitation in the accompanying figures, in which like references indicate similar elements throughout the several views of the drawings, and in which:

FIG. 1 illustrates a circuit of a resonant clock distribution network of the present invention;

FIG. 2 illustrates a plot of clock signal voltage for a clock distribution circuit of the prior art;

FIG. 3 illustrates a plot of clock signal voltage for the clock distribution circuit of FIG. 1;

FIGS. 4A, 4B and 4C illustrate cross-sectional and top views of a one-layer spiral inductor and a multiple-layer spiral inductor for the resonant clock distribution network of FIG. 1;

FIGS. 5A, 5B, 5C, 5D, 5E, 5F and 5G illustrate cross-sectional and top views of an alternative one-layer spiral inductor for the resonant clock distribution network of FIG. 1;

FIGS. 6A, 6B, 6C, 6D and 6E illustrate optional locations of the clock driver and the inductor for the resonant clock distribution network of FIG. 1.

Figure 7:
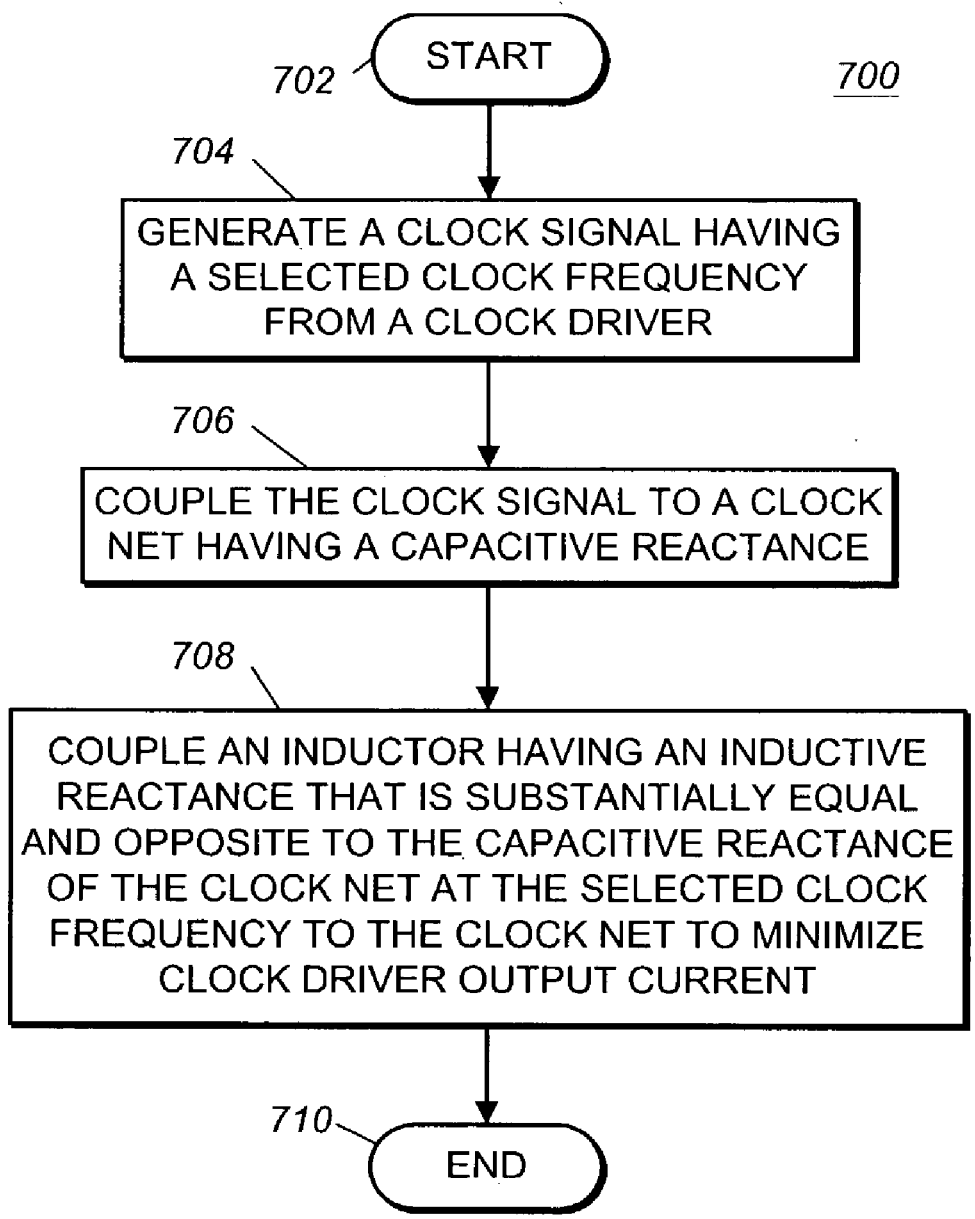
FIG. 7 illustrates a flow chart for a method of distributing a clock signal according to an embodiment of the present invention.

Elements in the figures are illustrated for simplicity and clarity and have not necessarily been drawn to scale. For example, the dimensions of some of the elements in the figures may be exaggerated relative to other elements to help to improve understanding of the following description of the illustrated embodiments.

DESCRIPTION OF THE ILLUSTRATED EMBODIMENTS

As technology accommodates more and more devices into integrated circuit designs, the increased number of clocked devices, generally called flip-flops, places greater demands on the system clock driver. Specifically, the input capacitance of the flip-flops connected to the system clock driver has a capacitive reactance that significantly increases the system clock current during switching of the clock signal between the power and ground rails. The capacitive reactance may be compensated by inductive reactance, however, in many clock distribution networks, the clock frequency is typically too low to make a short wire length resonant and too high for on-chip wires to make an efficient transmission line. These limitations prevent the use of previous resonant clock distribution networks at clock frequencies at about 500 Mhz and above used in currently available technology.

In one aspect of the present invention, a clock distribution network for an integrated circuit includes a clock driver for generating a clock signal having a selected clock frequency, a clock net coupled to the clock driver wherein the clock net has a capacitive reactance, and an inductor coupled to the clock net wherein the inductor has an inductive reactance that is substantially equal and opposite to the capacitive reactance of the clock net at the selected clock frequency to minimize clock driver output current through the clock net.

FIG. 1 illustrates a circuit of a resonant clock distribution network 100 for an integrated circuit of the present invention. Shown in FIG. 1 are a clock driver 102, a series resistance $R_{drv}$ 104, an inductor 106, a load capacitance $C_1$ 108, and a clock driver current i(t) 110.

The clock driver 102 has a typical output resistance of a few ohms, represented in FIG. 1 as the series resistance $R_{drv}$ 104. The load capacitance 108 represents the total capacitance of all the clocked devices coupled to the output of the clock driver 102 that are driven by the clock driver 102 in the clock distribution network 100. The connections between the clock driver 102 and the clocked devices that are driven by the clock driver 102 in the clock distribution network 100 are generally referred to herein as the net interconnects. The net interconnects and the clocked devices that are driven by the clock driver 102 in the clock distribution network 100 are generally referred to herein as the clock net. The parasitic resistance of the connections between the clock driver 102 and the clocked devices in the clock net is typically of the order of tenths of an ohm and does not significantly affect the clock driver current i(t) 110.

The clock driver current i(t) 110 is representative of the clock power dissipation. The higher the load capacitance $C_1$ 108, the higher the clock driver current i(t) 110. The resonant frequency of the clock distribution network 100 is given by:

$$f = \frac{1}{2\pi\sqrt{LC_l}} \quad (1)$$

where L is the inductance of the inductor 106 and $C_1$ is the load capacitance 108 of the clock net. The clock frequency range may be as low as about 500 MHz depending on the design size and the load capacitance 108 of the clock net, for example, if $C_1$ is about 1 nF and L is about 0.1 nH. For higher clock frequencies, smaller inductors are required.

If the reactance of the inductor 106 coupled to the output of the clock driver 102 is substantially equal and opposite to the reactance of the load capacitance 108 at the clock frequency, a condition referred to as resonance, the clock driver current i(t) 110 is minimized. The reactive power stored in the load capacitance 108 is transferred to the inductor 106 and recycled back to the load capacitance 108 on the next clock cycle instead of being dissipated as heat through the series resistance $R_{drv}$ 104.

The required inductance L of the inductor 106 for a specific clock frequency $f_c$ may be found by rearranging and substituting formula (1) as follows:

$$L = \frac{1}{(2\pi f_c)^2 C_l} \quad (2)$$

FIG. 2 illustrates a plot of clock signal voltage for a clock distribution circuit of the prior art. Shown in FIG. 2 are a clock driver voltage $V_1$ 202 and a clock net voltage $V_2$ 204. The combination of the series resistance $R_{drv}$ 104 and the load capacitance $C_1$ 108 results in a severe voltage droop in the clock net voltage $V_2$ 204 at the leading edge of the clock driver voltage $V_1$ 202 and a significant decay time in the clock net voltage $V_2$ 204 at the falling edge of the clock driver voltage $V_1$ 202.

FIG. 3 illustrates a plot of clock signal voltage for the clock distribution circuit of FIG. 1. Shown in FIG. 3 are a clock driver voltage $V_1$ 202 and a clock net voltage $V_2$ 302. As a result of coupling the inductor 106 to the clock net, the clock net voltage $V_2$ 302 has a much less severe droop at the leading edge of the clock driver voltage $V_1$ 202 and a faster decay time at the falling edge of the clock driver voltage $V_1$ 202. Further, the power returned to the clock net by the inductor 106 advantageously reduces the clock driver current i(t) 110.

The clock driver 102 may be any of a wide variety of well-known clock drivers for integrated circuits readily available from integrated circuit manufacturers. The clock driver 102 may be fabricated on-chip, or it may be packaged externally to the integrated circuit and connected via a clock input pin of the integrated circuit according to well-known techniques.

The inductor 106 is preferably biased at one-half the power rail voltage and may be, by way of example, a conventional helical wire inductor external to the integrated circuit, a conventional one-layer spiral inductor fabricated on-chip using CMOS compatible $Cu/SiO_2$ interconnect technology, or a multi-layer spiral inductor that may also be fabricated on-chip using CMOS compatible $Cu/SiO_2$ interconnect technology as described in "High-Q Multilayer Spiral Inductor on Silicon Chip for 5~6 Ghz", Lihui et al., IEEE Electron Device Letters, Vol 23, No. 8, August 2002, pp. 470–472. A one-layer spiral inductor and a multi-layer spiral inductor that may be fabricated on-chip using CMOS compatible $Cu/SiO_2$ interconnect technology according to Lihui et al. as follows.

FIGS. 4A, 4B and 4C illustrate cross-sectional and top views of a one-layer spiral inductor and a multiple-layer spiral inductor for the resonant clock distribution network 100 of FIG. 1. Shown in FIGS. 4A, 4B and 4C are a cross-sectional view 402, a top view 404, a one-layer spiral inductor 406, a multiple-layer spiral inductor 408, a silicon substrate 410, a silicon dioxide layer 412, vias 414, a first metal layer 416, an insulating layer 418, and a second metal layer 420.

The one-layer spiral inductor 406 is formed in the first metal layer 416. Connection to the inside of the one-layer spiral inductor 406 is made through the second metal layer and a via 414. In this example, the multiple-layer spiral inductor 408 is formed in the first metal layer 416 and the second metal layer 420, however the multiple-layer spiral inductor 408 may be formed in additional metal layers in the same manner. Connection between the clock net and the inside of the multiple-layer spiral inductor 408 in each metal layer is made through a via 414 as shown.

By way of example, the coil widths of the one-layer spiral inductor 406 and the multiple-layer spiral inductor 408 may be 8 microns, the spacing between turns may be 2 microns, the inner core diameter may be 75 microns, and the shape may be generally spiral. The multiple-layer spiral inductor 408 requires fewer turns for the same value of inductance than the one-layer spiral inductor 406.

The silicon substrate 410 may be, for example, a standard low resistivity silicon wafer typically used in complementary metal oxide semiconductor (CMOS) integrated circuit fabrication. The silicon dioxide layer 412 may be replaced by the standard interconnect layers of a 0.18 micron process under the one-layer spiral inductor 406 and the multiple-layer spiral inductor 408.

After forming the lower spiral of the multiple-layer spiral inductor 408 or an underpass for connecting the one-layer spiral inductor 406 to the clock net, the vias 414 may be made according to well-known techniques. The upper spiral of the multiple-layer spiral inductor 408 or the spiral of the one-layer spiral inductor 406 may then be formed and connected to the clock net according to well-known techniques. By way of example, the thickness of each spiral may be 2.9 microns and the height of the vias 414 may be from 0.7 microns to 2.9 microns.

The number of turns and the dimensions of the one-layer spiral inductor 406 and the multiple-layer spiral inductor 408 may be varied to obtain a quality factor (Q), that is, the inductive reactance divided by the resistance, of 12 or more at clock frequencies between 500 Mhz and 5 GHz.

Another example of a one-layer spiral inductor is described in "Silicon-Based High-Q Inductors incorporating Electroplated Copper and Low-K BCB Dielectric", Huo et al., IEEE Electron Device Letters, Vol. 23, No. 9, September 2002, pp. 520–522 and may be made as follows.

FIGS. 5A, 5B, 5C, 5D, 5E, 5F and 5G illustrate cross-sectional and top views of an alternative one-layer spiral inductor 500 for the resonant clock distribution network of FIG. 1. Shown in FIGS. 5A, 5B, 5C, 5D, 5E, 5F and 5G are cross-sectional views 502, 504, 506, 508, 510 and 512, a top view 514, copper electroplating 516, an outside port 518, an inside port 520, low-K dielectric layer 522, a silicon substrate 524, an aluminum metal strip 526, an oxide layer 528, a via 530, a Ti—W/copper seed layer 532, and a photoresist layer 534.

The cross-sectional views 502, 504, 506, 508, 510 and 512 illustrate the fabrication process of the one-layer spiral inductor 500. The silicon substrate 524 may be a CMOS p-type silicon substrate having a resistivity of about 20 ohm-cm. The aluminum metal strip 526 may have a thickness of 0.5 micron and be sandwiched by the oxide layer 528, also 0.5 micron thick, to provide interconnections between the one-layer spiral inductor 500 and the clock net driven by the clock driver 102 in FIG. 1. The low-K dielectric layer 522 may be, for example, a photosensitive benzocyclobutene (BCB) layer that is spin-coated and patterned as shown in the cross-sectional view 504. The thickness of the low-K dielectric 522 may be, for example, 6 microns.

The via 530 is opened on the aluminum metal strip 526 as shown in the cross-sectional view 504 for contacting the copper electroplating 516 after curing the low-K dielectric layer 522. The Ti—W/copper seed layer 532 may be sputtered on the silicon substrate 524 according to well-known techniques as shown in the cross-sectional view 506. Typical thicknesses for the Ti—W and copper layers are 80 nm and 350 nm, respectively.

The photoresist layer 534 may then be coated on the Ti—W/copper seed layer 532 and the one-layer spiral inductor 500 may be patterned according to well-known photolithography techniques as shown in the cross-sectional view 508. The copper electroplating 516 is then deposited as shown in the cross-sectional view 510, and the photoresist layer 534 and the Ti—W/copper seed layer 532 may be removed by chemical stripping, for example, organic stripping and metal etching as shown in the cross-sectional view 512. The result is the one-layer spiral inductor 500 shown in the top view 514. Connections between the one-layer spiral inductor 500 and the clock net are made at the outside port 518 and the inside port 520. The entire fabrication of the one-layer spiral inductor 500 may be performed below 250 degrees Centigrade, which is a suitable temperature for a post-IC process. The thickness of the low-K dielectric layer 522 and the copper electroplating 516 may be scaled to optimize the performance of the one-layer spiral inductor 500 for different inductance values and clock frequencies. The spiral inductor 500 may be made with a Q of 12 or more at clock frequencies between 500 Mhz and 5 GHz.

FIGS. 6A, 6B, 6C, 6D and 6E illustrate optional locations 602, 604, 606, 608 and 610 of the clock driver and the inductor for the resonant clock distribution network of FIG. 1. In the optional location 602, the clock driver 102, the inductor 106, and the clock net are formed on a single substrate. In the optional location 604, the clock driver 102 is formed on a separate substrate from a single substrate on which the inductor 106 and the clock net are formed. In the optional location 606, the inductor 106 is formed on a separate substrate from a single substrate on which the clock driver 102 and the clock net are formed. In the optional location 608, the inductor 106 and the clock driver 102 are formed on separate substrates from a single substrate on which the clock net is formed. In the optional location 610, the inductor 106 and the clock driver 102 are formed on a single substrate separate from a single substrate on which the clock net is formed.

In another aspect of the present invention, a method of distributing a clock signal in an integrated circuit includes the steps of generating a clock signal having a selected clock frequency from a clock driver, coupling the clock signal to a clock net having a capacitive reactance, and coupling an inductor to the clock net wherein the inductor has an inductive reactance that is substantially equal and opposite to the capacitive reactance of the clock net at the selected clock frequency to minimize clock driver output current through the clock net.

FIG. 7 illustrates a flow chart 700 for a method of distributing a clock signal according to an embodiment of the present invention.

Step 702 is the entry point of the flow chart 700.

In step 704, a clock signal is generated having a selected clock frequency from a clock driver.

In step 706, the clock signal is coupled to a clock net having a capacitive reactance.

In step 708, an inductor having an inductive reactance that is substantially equal and opposite to the capacitive reactance of the clock net at the selected clock frequency is coupled to the clock net to minimize clock driver output current.

Step 710 is the exit point of the flow chart 700.

While the invention herein disclosed has been described by means of specific embodiments and applications thereof, numerous modifications and variations may be made thereto by those skilled in the art without departing from the scope of the invention set forth in the following claims.

What is claimed is:

1. A clock distribution network for an integrated circuit comprising:
    a clock driver for generating a clock signal having a selected clock frequency;
    a clock net coupled to an output of the clock driver wherein the clock net has a capacitive reactance; and
    an inductor coupled to the output of the clock driver wherein the inductor has an inductive reactance that is substantially equal and opposite to the capacitive reactance of the clock net at the selected clock frequency to minimize clock driver output current.

2. The clock distribution network of claim 1 wherein the clock driver, the inductor, and the clock net are formed on a single substrate.

3. The clock distribution network of claim 1 wherein the clock driver is formed on a separate substrate from a single substrate on which the inductor and the clock net are formed.

4. The clock distribution network of claim 1 wherein the inductor is formed on a separate substrate from a single substrate on which the clock driver and the clock net are formed.

5. The clock distribution network of claim 1 wherein the inductor and the clock driver are formed on separate substrates from a single substrate on which the clock net is formed.

6. The clock distribution network of claim 1 wherein the inductor and the clock driver are formed on a single substrate separate from a single substrate on which the clock net is formed.

7. The clock distribution network of claim 1 wherein the inductor is one of a helical wire inductor, a one-layer spiral inductor, and a multiple-layer spiral inductor.

8. The clock distribution network of claim 1 wherein the selected clock frequency is between about 500 MHz and 5 GHz.

9. A method of distributing a clock signal in an integrated circuit comprising the steps of:
- generating a clock signal having a selected clock frequency from an output of a clock driver;
- coupling a clock net having a capacitive reactance to the output of the clock driver; and
- coupling an inductor to the output of the clock driver wherein the inductor has an inductive reactance that is substantially equal and opposite to the capacitive reactance of the clock net at the selected clock frequency to minimize clock driver output current.

10. The method of claim 9 further comprising forming the clock driver, the inductor, and the clock net on a single substrate.

11. The method of claim 9 further comprising forming the clock driver on a separate substrate from a single substrate on which the inductor and the clock net are formed.

12. The method of claim 9 further comprising forming the inductor on a separate substrate from a single substrate on which the clock driver and the clock net are formed.

13. The method of claim 9 further comprising forming the inductor and the clock driver on separate substrates from a single substrate on which the clock net is formed.

14. The method of claim 9 further comprising forming the inductor and the clock driver on a single substrate separate from a single substrate on which the clock net is formed.

15. The method of claim 9 wherein the inductor is one of a helical wire inductor, a one-layer spiral inductor, and a multiple-layer spiral inductor.

16. The method of claim 9 wherein the selected clock frequency is between about 500 MHz and 5 GHz.

* * * * *